(12) United States Patent
Zhou et al.

(10) Patent No.: US 12,158,603 B2
(45) Date of Patent: Dec. 3, 2024

(54) BACKLIGHT MODULE AND DISPLAY DEVICE

(71) Applicants: Beijing BOE Display Technology Co., Ltd., Beijing (CN); BOE Technology Group Co., Ltd., Beijing (CN)

(72) Inventors: Qiaoke Zhou, Beijing (CN); Zhanchang Bu, Beijing (CN); Bochang Wang, Beijing (CN); Xiang Li, Beijing (CN); Bo Li, Beijing (CN); Jing Wang, Beijing (CN); Hui Guo, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/914,742

(22) PCT Filed: Nov. 16, 2021

(86) PCT No.: PCT/CN2021/130918
§ 371 (c)(1),
(2) Date: Sep. 26, 2022

(87) PCT Pub. No.: WO2022/242068
PCT Pub. Date: Nov. 24, 2022

(65) Prior Publication Data
US 2024/0295685 A1    Sep. 5, 2024

(30) Foreign Application Priority Data

May 18, 2021 (CN) .......................... 202110551010.4

(51) Int. Cl.
*F21V 8/00* (2006.01)
(52) U.S. Cl.
CPC ......... *G02B 6/0053* (2013.01); *G02B 6/0036* (2013.01); *G02B 6/0086* (2013.01)

(58) Field of Classification Search
CPC ... G02B 6/0053; G02B 6/0036; G02B 6/0086
See application file for complete search history.

(56) References Cited

U.S. PATENT DOCUMENTS 10,191,211 B2 * 1/2019 Yonezawa ............ G02B 6/0065
2017/0371094 A1 12/2017 Lee et al.
(Continued)

FOREIGN PATENT DOCUMENTS

| CN | 101008732 A | 8/2007 |
|---|---|---|
| CN | 103034006 A | 4/2013 |

(Continued)

OTHER PUBLICATIONS

International Search Report for PCT/CN2021/130918 Mailed Feb. 23, 2022.
(Continued)

*Primary Examiner* — Christopher E Dunay
(74) *Attorney, Agent, or Firm* — Ling Wu; Stephen Yang; Ling and Yang Intellectual Property (57) ABSTRACT

Disclosed are a backlight module and a display device. The backlight module includes a backplate, a led-bar, a light guide plate and an optical sheet group; wherein the led-bar includes a plurality of light sources disposed towards the light entrance surface of the light guide plate; the light exit surface and the light entrance surface of the light guide plate are adjacent; a portion of the light exit surface of the light guide plate near the light entrance surface is provided with a step structure in which heights of steps gradually decrease in a first direction; the optical sheet group includes a plurality of optical sheets stacked on the side where the light exit surface of the light guide plate is located, and each of the optical sheets is fixed to a corresponding step in the step structure.

13 Claims, 9 Drawing Sheets

(56) References Cited

U.S. PATENT DOCUMENTS

| | | | | |
|---|---|---|---|---|
| 2019/0196093 | A1* | 6/2019 | Jung | .................... G02F 1/13452 |
| 2021/0026058 | A1* | 1/2021 | Shi | .......................... G02B 6/005 |
| 2021/0026060 | A1* | 1/2021 | Ye | ........................... G02B 6/002 |
| 2021/0333466 | A1* | 10/2021 | Zhou | .................... G02B 6/0055 |
| 2022/0120957 | A1* | 4/2022 | Zhang | .................... H05K 1/028 |

FOREIGN PATENT DOCUMENTS

| | | |
|---|---|---|
| CN | 107543068 A | 1/2018 |
| CN | 207081920 U | 3/2018 |
| CN | 207984734 U | 10/2018 |
| CN | 110596955 A | 12/2019 |
| CN | 108227066 B | 6/2020 |
| CN | 211318936 U | 8/2020 |
| CN | 111965902 A | 11/2020 |
| CN | 212135112 U | 12/2020 |
| CN | 113156709 A | 7/2021 |
| JP | 2000-48619 A | 2/2000 |

OTHER PUBLICATIONS

Sun Yufeng, Research On Visual Detection Algorithm for Mura Defect of Amoled Display Panel, A dissertation submitted in partial fulfillment of the requirements for the academic degree of Master of Engineering, Dec. 2018.

* cited by examiner

BACKLIGHT MODULE AND DISPLAY DEVICE

CROSS-REFERENCE TO RELATED APPLICATIONS

This application is a national stage application of PCT Application No. PCT/CN2021/130918, which is filed on Nov. 16, 2021 and claims the priority to the Chinese patent application No. 202110551010.4, entitled "Backlight Module and Display Device", filed to the CNIPA on May 18, 2021, the content of which should be regarded as being incorporated herein by reference.

TECHNICAL FIELD

Embodiments of the present disclosure relate to, but are not limited to the technical field of display, specifically to a backlight module and a display device.

BACKGROUND

As a key component of photoelectric display industry, backlight modules can provide stable, high brightness and uniform light for Liquid Crystal Display panel (LCD panel for short), so as to make liquid crystal display panel achieve display effect. With the development of display technology, consumers have increasingly high requirements on the picture quality of display devices. The performance of backlight modules has a great impact on the picture quality of display devices, so there's higher requirements on the performance of the backlight modules.

SUMMARY

The following is a summary of subject matters described herein in detail. The summary is not intended to limit the protection scope of claims.

A backlight module is provided in an embodiment of the present disclosure. The backlight module includes the backplate, a led-bar, the light guide plate and the optical sheet group, wherein the backplate includes a plate body and a baffle disposed at a circumferential edge of the plate body, the light guide plate is disposed at one side of the plate body, the light guide plate has a light exit surface away from the plate body and a light entrance surface adjacent to the light exit surface, the led-bar is disposed at the baffle and includes a plurality of light sources disposed towards the light entrance surface of the light guide plate. A portion of the light exit surface of the light guide plate near the light entrance surface is provided with a step structure in which heights of steps gradually decrease in a first direction. The optical sheet group includes a plurality of optical sheets stacked on the side where the light exit surface of the light guide plate is located, and each of the optical sheets is fixed to a corresponding step in the step structure. The plurality of optical sheets include a first prism sheet. A plurality of first prisms disposed side by side are disposed on a surface of the first prism sheet facing away from the light guide plate. The first prisms extend in a direction perpendicular to the first direction, an edge of the first prism sheet is provided with a notched groove that avoids the step structure, and a gap is provided between a groove wall, which is parallel to the first direction, of the notched groove of the first prism sheet and the step structure, wherein the gap ranges from 0.5 mm to 0.8 mm.

A display device is also provided in an embodiment of the present disclosure, which includes a display panel and the backlight module, wherein the backlight module is disposed on a side of the display panel away from a display side.

Other aspects may be understood upon reading and understanding the drawings and the detailed description.

BRIEF DESCRIPTION OF DRAWINGS

The drawings are intended to provide a further understanding of technical solutions of the present disclosure and form a part of the specification, and are used to explain the technical solutions of the present disclosure together with embodiments of the present disclosure, and not intended to form limitations on the technical solutions of the present disclosure. Shapes and sizes of various components in the drawings do not reflect actual scales, and are only intended to schematically illustrate the contents of the present disclosure.

DETAILED DESCRIPTION

Those of ordinary skills in the art should understand that modifications or equivalent replacements may be made to the technical solutions of the embodiments of the present disclosure without departing from the spirit and scope of the technical solutions of the embodiments of the present disclosure, and should all fall within the scope of the claims of the present disclosure.

Figure 1:
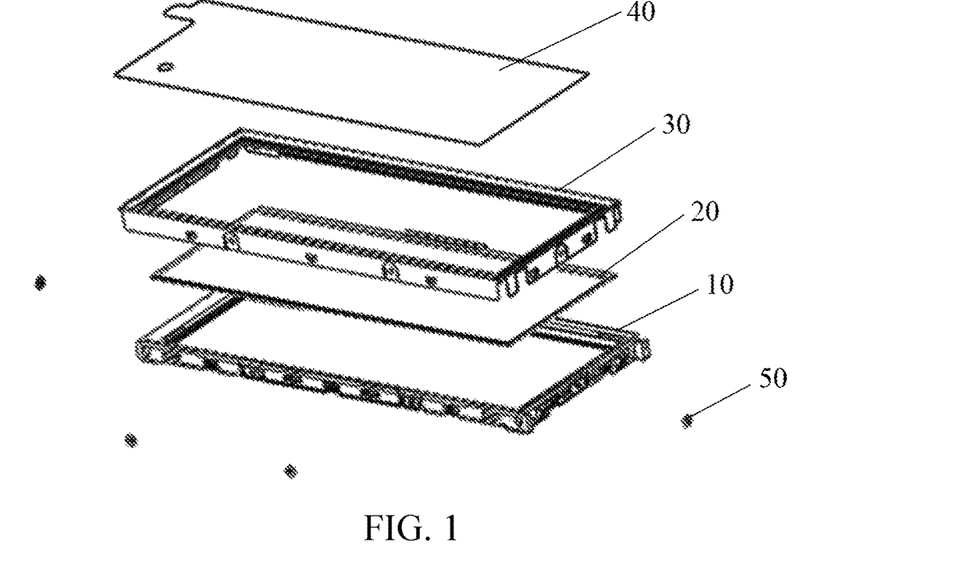
FIG. 1 is an exploded view of a part of a structure of a display device according to some exemplary embodiments.

As shown in FIG. 1, which is a exploded view of a part of a structure of a display device according to some exemplary embodiments, the display device includes an display panel 20, a backlight module 10 disposed on a side of the display panel 20 away from a display side, a front bezel 30 and a protect film 40. The front bezel 30 is fixedly connected to the backlight module 10 by a plurality (four in this example) of screws 50 and a circumferential edge of the display panel 20 is fixed between the front bezel 30 and the backlight module 10.

Figure 2:
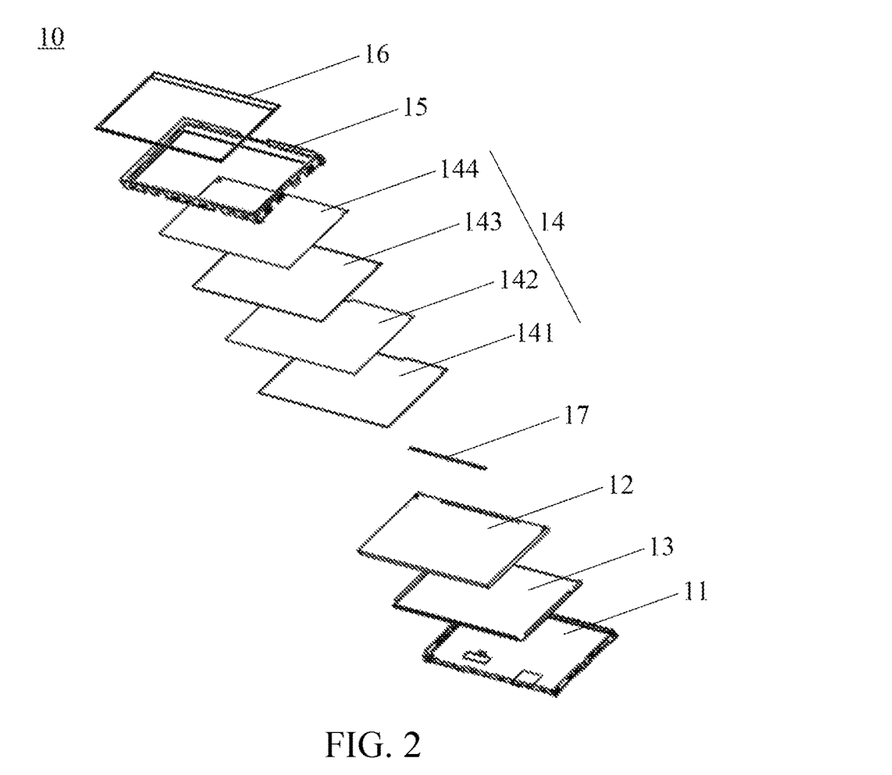
FIG. 2 is an exploded view of a structure of the backlight module of the display device in FIG. 1 according to some exemplary embodiments.

As shown in FIG. 2, which is a exploded view of a structure of the backlight module 10 of the display device in FIG. 1 according to some exemplary embodiments, the backlight module 10 may include a backplate 11, a led-bar, a reflector sheet 13, a light guide plate 12, an optical sheet group 14, a rubber bezel 15, and auxiliary materials such as a light-shielding tape 17 and a double-sided adhesive foam 16. The optical sheet group 14 may include a first diffuser sheet 141, a first prism sheet 142, a second prism sheet 143, and a second diffuser sheet 144 which are sequentially stacked on a side where a light exit surface of the light guide plate 12 is located. The led-bar can be disposed on the backplate 11 and on a side of the light guide plate 12.

FIGS. 3a to 3d are cross-sectional views of structures at four side edges of the display device in FIG. 1 according to some exemplary embodiments as shown in FIGS. 3a to 3d. The display device includes a display panel 20, a backlight module disposed on a side of the display panel 20 away from the display side, and a front bezel 30. A circumferential edge of the display panel 20 is fixed between the front bezel 30 and the rubber bezel 15 of the backlight module.

Figure 3A:
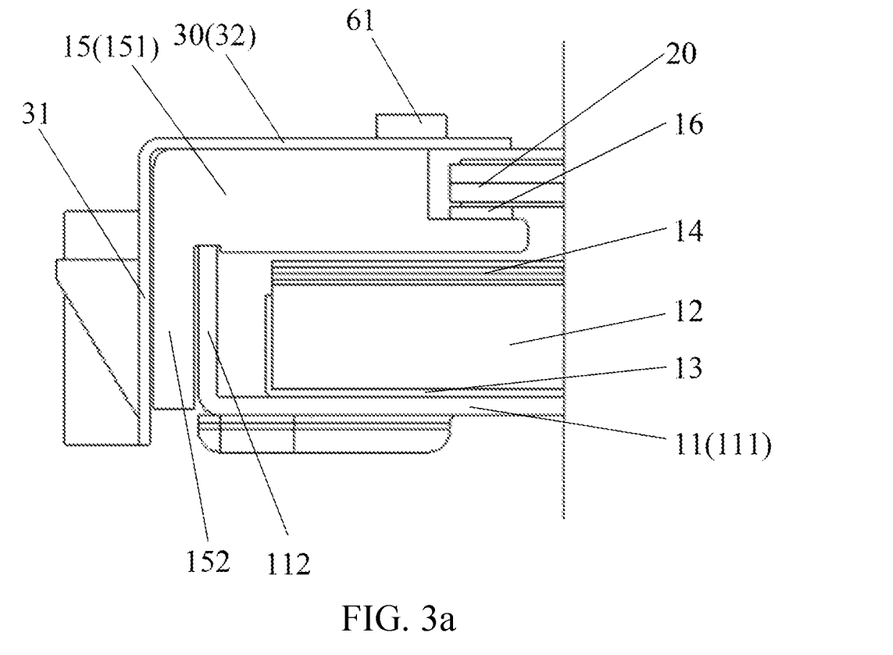
FIGS. 3a to 3d are cross-sectional views of structures at four side edges of the display device in FIG. 1 respectively, according to some exemplary embodiments.
Figure 3B:
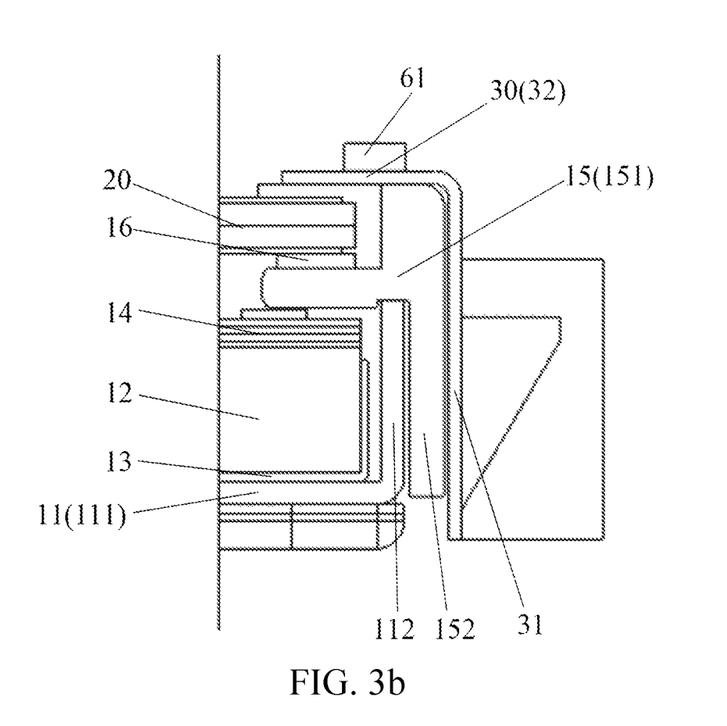
Figure 3C:
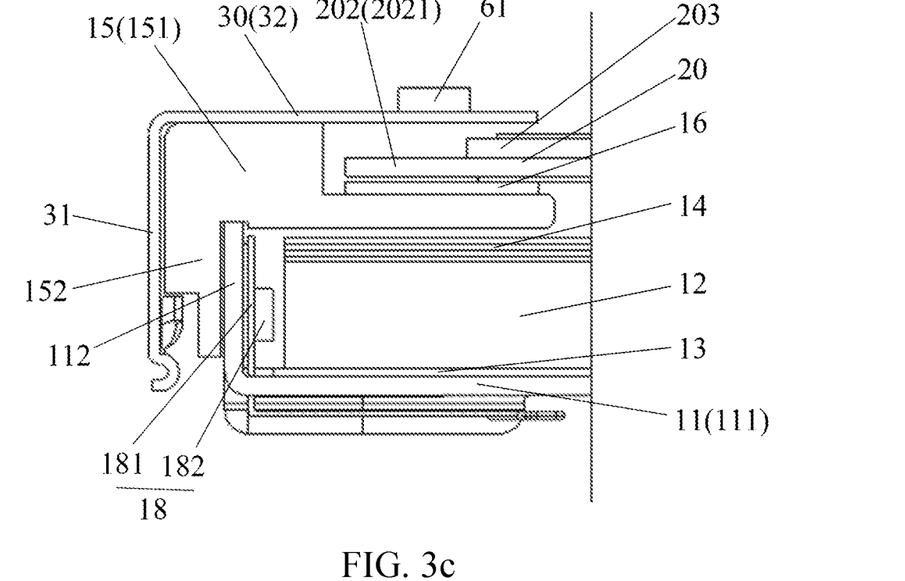
Figure 3D:
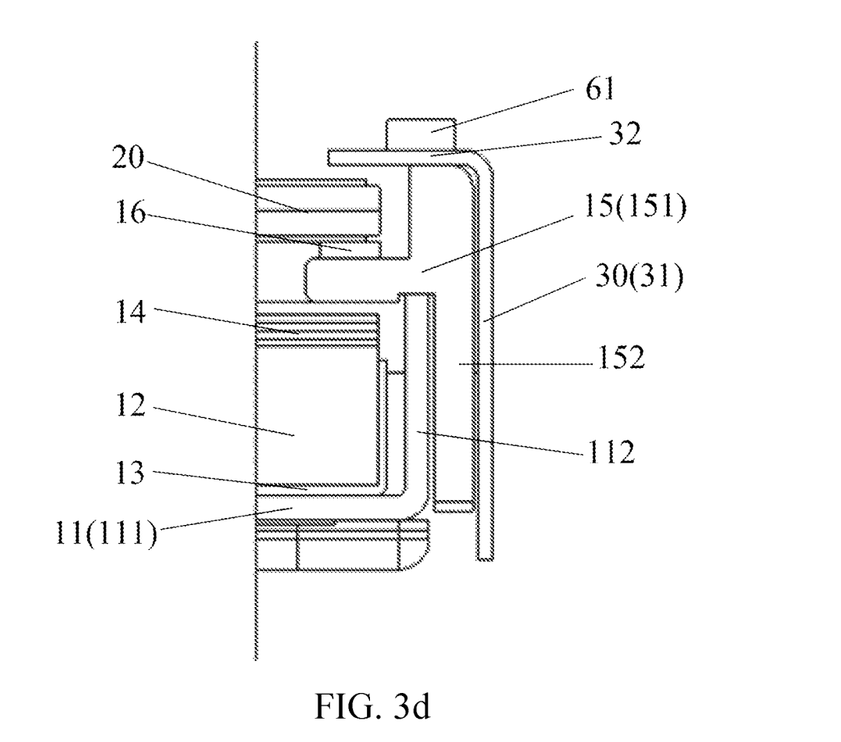
Figure 4:
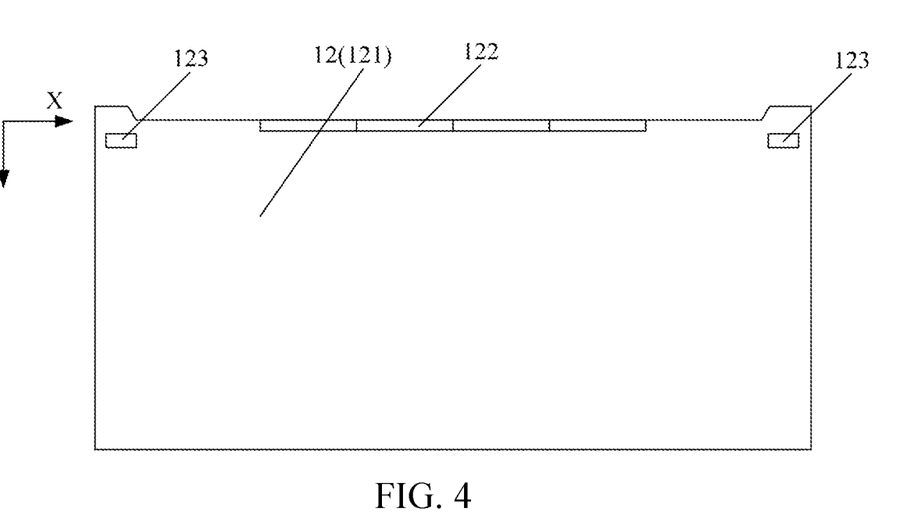
FIG. 4 is a schematic diagram of a structure of the light exit surface of the light guide plate of the backlight module in FIG. 2 according to some exemplary embodiments.
Figure 5A:
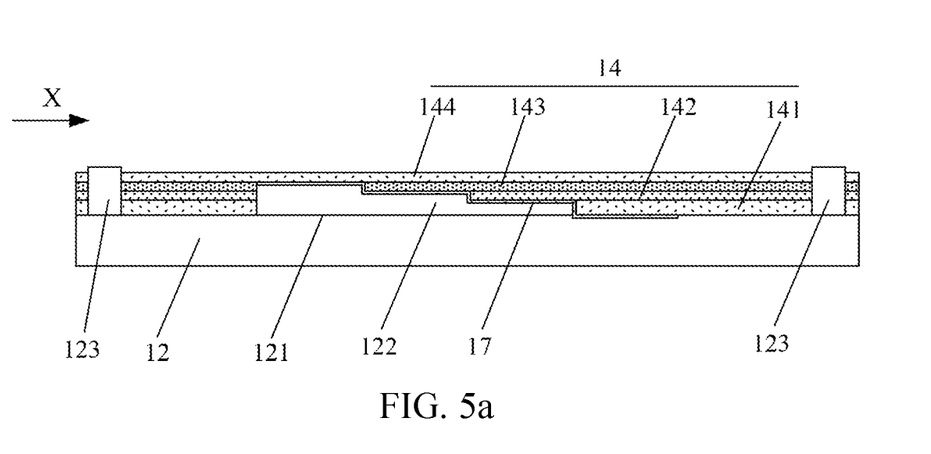
FIG. 5a is a schematic diagram of a structure of the light guide plate in FIG. 4 mating with four optical sheets of the optical sheet group according to some exemplary embodiments.
Figure 5B:
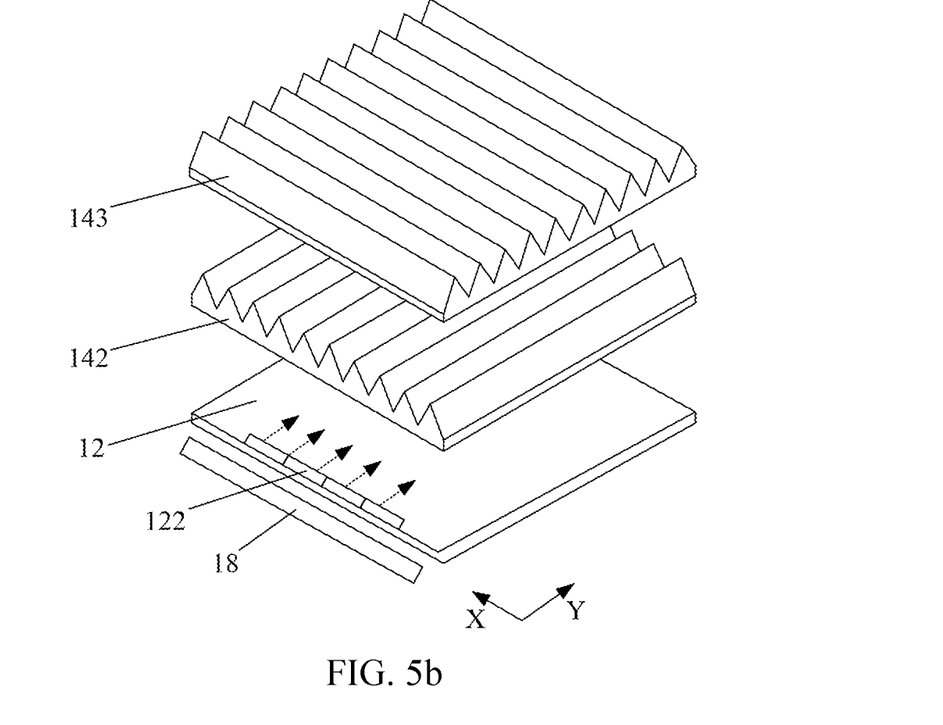
FIG. 5b is a schematic diagram of a structure of the light guide plate and a first prism sheet and a second prism sheet of the optical sheet group in FIG. 5a according to some exemplary embodiments.
Figure 6:
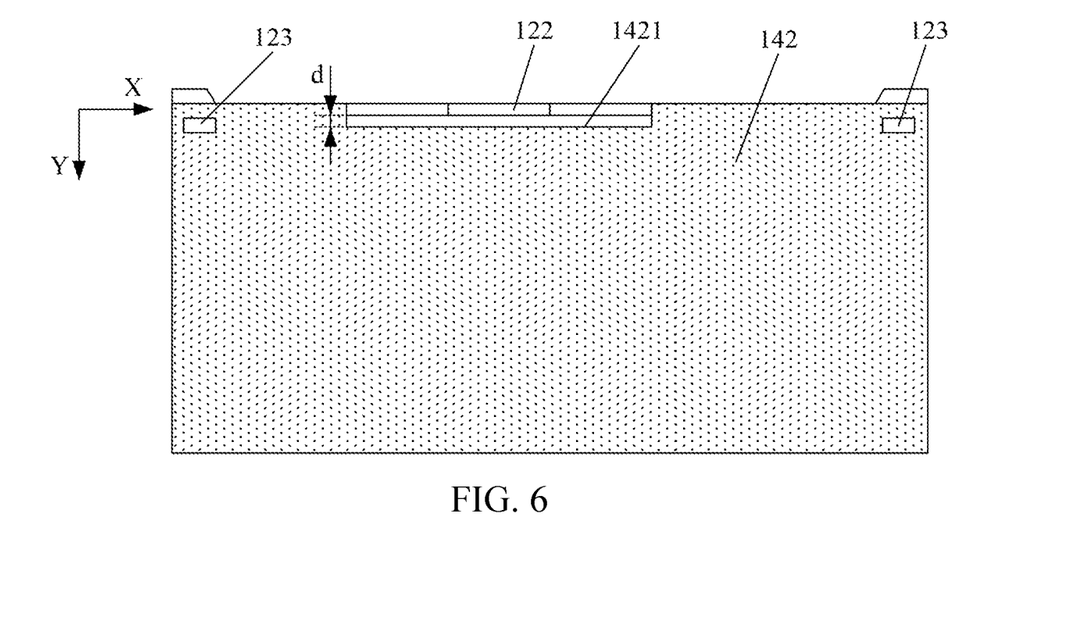
FIG. 6 is a schematic diagram of a structure of the light guide plate mating with the first prism sheet in FIG. 4 according to some exemplary embodiments.
Figure 7:
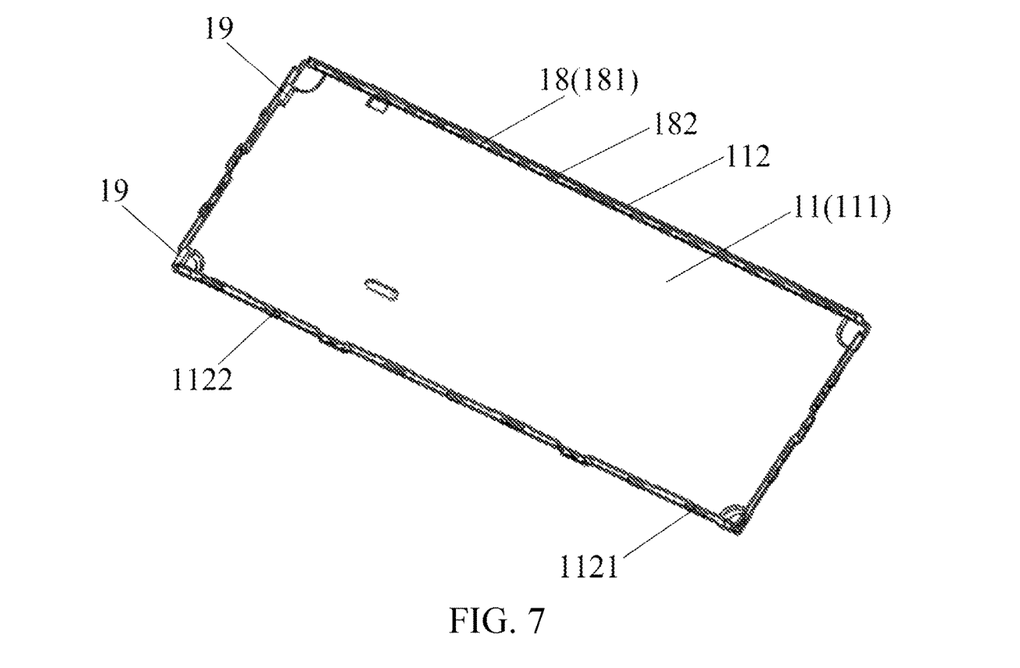
FIG. 7 is a schematic diagram of a structure of the backlight module and the led-bar of the backlight module in FIG. 2 according to some exemplary embodiments.

In some exemplary embodiments, as shown in FIGS. 3a to 3d and FIGS. 4 to 7, FIG. 4 is a schematic diagram of a structure of the light exit surface of the light guide plate of the backlight module in FIG. 2 according to some exemplary embodiments, FIG. 5a is a schematic diagram of a structure of the light guide plate in FIG. 4 mating with four optical sheets of the optical sheet group according to some exemplary embodiments, FIG. 5b is a schematic diagram of a structure of the light guide plate and a first prism sheet and a second prism sheet of optical sheet group in FIG. 5a according to some exemplary embodiments, FIG. 6 is a schematic diagram of a structure of the light guide plate mating with the first prism sheet in FIG. 4 according to some exemplary embodiments, and FIG. 7 is a schematic diagram of a structure of the backplate and the led-bar of the backlight module according to some exemplary embodiments. The backlight module includes the backplate 11, a led-bar 18 (shown in FIG. 3c), the light guide plate 12 and the optical sheet group 14, wherein the backplate 11 includes a plate body 111 and a baffle 112 disposed at a circumferential edge of the plate body 111, the light guide plate 12 is disposed at one side of the plate body 111, the light guide plate 12 has a light exit surface facing away from the plate body 111 and a light entrance surface adjacent to the light exit surface, the led-bar 18 is disposed on the baffle 112 and includes a plurality of light sources 182 disposed towards the light entrance surface of the light guide plate 12. As shown in FIGS. 4 to 6, a portion of the light exit surface 121 of the light guide plate 12 close to the light entrance surface is provided with a step structure 122 in which heights of steps gradually decrease in a first direction (an X direction in the figure, and the first direction may be a length direction of the light entrance surface of the light guide plate 12 in some examples). The optical sheet group 14 includes a plurality of optical sheets stacked on the side where the light exit surface of the light guide plate 12 is located, and each of the optical sheets is fixed to a corresponding step in the step structure 122. The plurality of optical sheets include a first prism sheet 142. A plurality of first prisms (V-shaped protrusions shown in FIG. 5b) disposed side by side are disposed on a surface of the first prism sheet 142 facing away from the light guide plate 12. The first prisms extend in a direction (Y direction in FIG. 5b) perpendicular to the first direction, an edge of the first prism sheet 142 is provided with a notched groove 1421 that avoids the step structure 122, and a gap d (shown in FIG. 6) is provided between a groove wall, which is parallel to the first direction, of the notched groove 1421 of the first prism sheet 142 and the step structure 122, wherein the gap d ranges from 0.5 mm to 0.8 mm.

In the backlight module according to the embodiment of the present disclosure, as shown in FIGS. 4 to 6, the plurality of optical sheets of the optical sheet group 14 cooperate with the step structure 122 provided in the light guide plate 12 to restrict a movement of the plurality of optical sheets, the step structure 122 of the light guide plate 12 is disposed at the portion of the light exit surface 121 of the light guide plate 12 close to the light entrance surface, and the height of the steps in the step structure 122 gradually decreases in the first direction (X direction in the figure). The plurality of optical sheets include a first prism sheet 142, and a surface of the first prism sheet 142 facing away from the light guide plate 12 is provided with a plurality of first prisms arranged side by side, wherein the first prism extends in a direction (Y direction in the figure) perpendicular to the first direction. An edge of the first prism sheet 142 is provided with a notched groove 1421 to avoid the step structure 122, and a gap d of 0.5 mm to 0.8 mm is provided between the groove wall, which is parallel to the first direction, of the notched groove 1421 of the first prism sheet 142 and the step structure 122 (shown in FIG. 6). Due to the presence of the step structure 122 on the light guide plate 12, part of light emitted by the light source 182 of the led-bar 18 is directly incident into the step structure 122, and light (indicated by five dashed arrows in FIG. 5b) emitted from the step structure 122 is incident into the first prism sheet 142 from the groove wall of the notched groove 1421 of the first prism sheet 142. The first prism sheet 142 has a converging effect on this part of the incident light, which causes the backlight module to produce a bright stripe extending in a direction (Y direction in the figure) perpendicular to the first direction at a position corresponding to the step structure 122, causing uneven light output from the backlight module. By providing the gap d of 0.5 mm to 0.8 mm between the groove wall, which is parallel to the first direction, of the notched groove 1421 of the first prism sheet 142 and the step structure 122, the presence of the gap d reduces the intensity of the light incident from the step structure 122 into the first prism sheet 142, thereby reducing a phenomenon that the light emitted from the backlight module produces the bright stripe at the position corresponding to the step structure 122, and improving the uniformity of the light emitted from the backlight module.

In some exemplary embodiments, as shown in FIGS. 2, 3a-3d, and 5b, the optical sheet group 14 includes the first diffuser sheet 141, the first prism sheet 142, the second prism sheet 143, and the second diffuser sheet 144 that are sequentially stacked on the light exit surface 121 of the light guide plate 12, wherein a surface of the second prism sheet 143 facing away from the light guide plate 12 is provided with a plurality of second prisms (V-shaped protrusions shown in FIG. 5b) disposed side by side, and the second prisms extend in a direction parallel to the first direction (X direction in FIG. 5b). The first diffuser sheet 141 and the second diffuser sheet 144 can uniformly diffuse light, the first prism sheet 142 can brighten outgoing light in a direction (the Y direction in FIG. 5b) perpendicular to the first direction, while the second prism sheet 143 can brighten the outgoing light in a direction parallel to the first direction (X direction in FIG. 5B), and a combination of the first prism sheet 142 and the second prism sheet 143 can cause the light exited from the backlight module to converge toward the central viewing angle and have uniform brightness. The first diffuser sheet 141, the first prism sheet 142, the second prism sheet 143 and the second diffuser sheet 144 are used together to improve the brightness and uniformity of the planar outgoing light of the backlight module. In some examples, the thickness of the first diffusion sheet 141 may be 0.125 mm, the thickness of the first prism sheet 142 may be 0.152 mm, the thickness of the second prism sheet 143 may be 0.158 mm, and the thickness of the second diffusion sheet 144 may be 0.2 mm. In other implementations, positions of the first prism sheet and the second prism sheet may be switched or the second prism sheet may not be provided.

In some exemplary embodiments, as shown in FIG. 5a, a surface of the step structure 122 facing away from the plate body 111 may be bonded to a plurality of the optical sheets by the light-shielding tape 17, the edges of the plurality of the optical sheets are provided with notched grooves to avoid the step structure 122. As an example, as shown in FIG. 5a, the optical sheet group 14 includes the first diffuser sheet 141, the first prism sheet 142, the second prism sheet 143 and the second diffuser sheet 144 which are sequentially stacked on the light exit surface 121 of the light guide plate 12. The step structure 122 includes a first step, a second step, a third step and a fourth step with a height gradually decreasing in the first direction X, wherein the first step, the second step and the third step protrude from the light exit surface 121 of the light guide plate 12, and the fourth step is a groove disposed on the light exit surface 121 of the light guide plate 12. Surfaces of the first step, the second step, the third step and the fourth step facing away from the plate body 111 are bonded and fixed to the second diffuser sheet 144, the second prism sheet 143, the first prism sheet 142 and the first diffuser sheet 141, respectively, by the light-shielding tape 17. The light-shielding tape 17 may be a black tape with a thickness of 0.05 mm. The material of the light guide plate 12 may be polycarbonate (PC).

In some exemplary embodiments, as shown in FIGS. 4 to 6, at least one (two shown in FIG. 4) fixing post 123 may also be disposed on the light exit surface 121 of the light guide plate 12, and each of the optical sheets is provided with a positioning hole inserted and matched with the fixing post 123 to restrict the movement of each of the optical sheets.

In some exemplary embodiments, as shown in FIGS. 3c and 7, the led-bar 18 may include a first circuit board 181 fixed to the baffle 112 and a plurality of (e.g. 18 in this example) light sources 182 spaced on the first circuit board 181, and the plurality of light sources 182 may be disposed in a row. The light emitted by the plurality of light sources 182 may be incident from the light entrance surface of the light guide plate 12 to an inside of the light guide plate 12 in a side entrance manner and emitted from the light exit surface of the light guide plate 12.

In some exemplary embodiments, as shown in FIG. 7, the plate body 111 is in a rectangular shape, and each position on a surface of the plate body 111 towards the light guide plate 12 may be provided with a localizer 19 near four corners, and the localizers 19 may be in a cuboid shape or an L-shape. The four localizers 19 may be provided to position the positions of the light guide plate 12 near the four corners. The material of the localizer 19 may be an elastic material such as white silastic matrix, the hardness may be 40 degrees, and the compression ratio may be greater than or equal to 60%. For example, FIG. 7 shows two localizers 19 located near both ends of one short side of the plate body 111, wherein the localizer 19 adjacent to the led-bar 18 may be in a rectangular shape and have a thickness of 1.5 mm in a direction parallel to a length of the plate body 111, and the localizer 19 away from the led-bar 18 may be in an L shape and have a thickness of 1.5 mm in a direction parallel to the length of the plate body 111 and a thickness of 0.6 mm in a direction perpendicular to the length of the plate body 111.

In some exemplary embodiments, as shown in FIGS. 3a to 3d, the baffle 112 is disposed around the circumferential sides of the light guide plate 12 and the plurality of optical sheets, and each of the circumferential edges of the light guide plate 12 and the plurality of optical sheets have a gap with the baffle 112. Thus, when the backplate 11 is deformed or the like, problems such as deformation and wrinkling caused by contact of the light guide plate 12 and the optical sheet with the backplate 11 can be avoided, thereby avoiding affecting the display picture quality.

In some exemplary embodiments, as shown in FIGS. 3a to 3d, the backlight module may further include a reflector sheet 13 disposed on a side of the light guide plate 12 away from the light exit surface, and a circumferential edge of the reflector sheet 13 may be provided with a flange that is attached on the circumferential side of the light guide plate 12 and avoids the light entrance surface. In this way, the reflector sheet 13 can reflect the light emitted from the light guide plate 12 into the light guide plate 12, thereby improving the utilization ratio of the light. In an example of this embodiment, the baffle 112 of the backplate 11 may surround the circumferential sides of the light guide plate 12, the reflector sheet 13, and the optical sheet group 14, the circumferential edges of all of the circumferential edges of the light guide plate 12, the reflector sheet 13, and the optical sheets of the optical sheet group 14 may be gaps with the baffles 112, thereby avoiding wrinkles caused by contact with the backplate 11 when the backplate 11 is deformed or the like, thereby avoiding affecting the picture quality of the display panel. The thickness of the reflector sheet 13 may be 0.188 mm.

In some exemplary embodiments as shown in FIGS. 3a to 3d and FIG. 8, FIG. 8 is a schematic diagram of a structure of the rubber bezel of the backlight module according to some exemplary embodiments. The backlight module may also include a rubber bezel 15 that may include a first frame 151 and a rib 152 disposed at a circumferential edge of the first frame 151, wherein the first frame 151 may be disposed at a side of the optical sheet group 14 facing away from the light guide plate 12, and the rib 152 may surround a circumferential side of the baffle 112. A surface of the first frame 151 facing the light exit surface 121 of the light guide plate 12 may have a gap with a portion, which is near a circumferential edge, of an optical sheet (which may be the second diffuser sheet in some examples) of the optical sheet group 14 away from the light guide plate 12, Thus, when the optical sheet expands, wrinkling caused by abutment with the first frame 151 can be avoided. Furthermore, the rib 152 is disposed around the circumferential side of the rib 112 so as to facilitate fixing the rubber bezel 15 to the backplate 11 by the rib 152 and the baffle 112.

Figure 8:
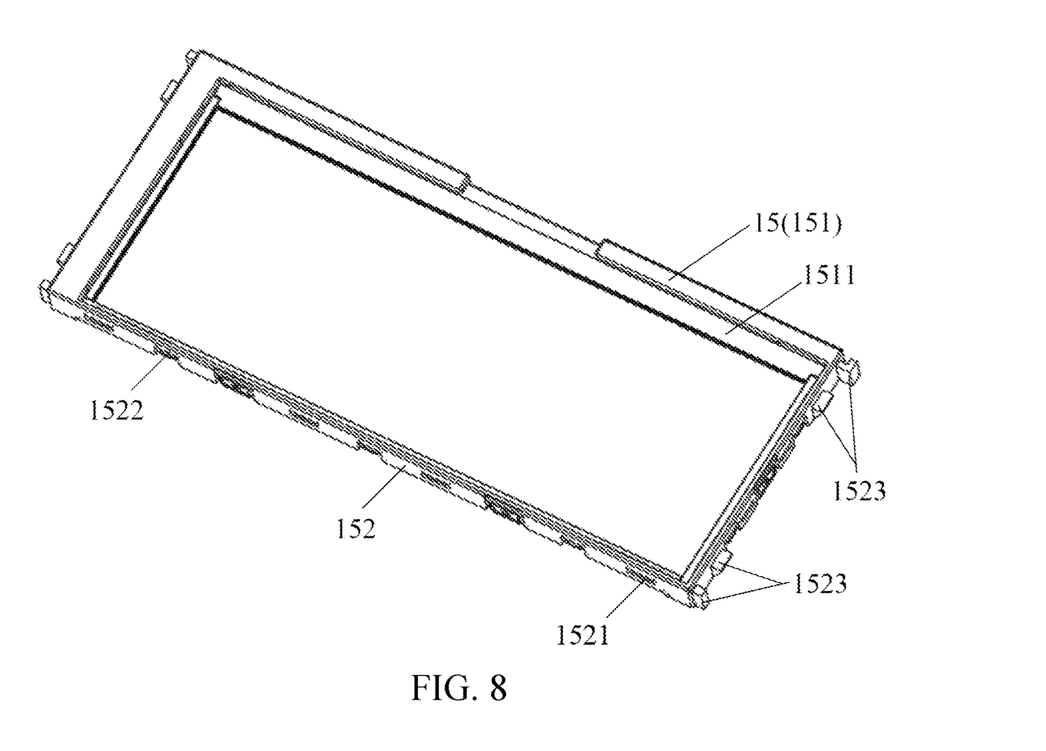
FIG. 8 is a schematic diagram of a structure of the rubber bezel of the backlight module in FIG. 2 according to some exemplary embodiments.

In an example of the present embodiment, as shown in FIGS. 7 and 8, the baffle 112 may be provided with a plurality of first buckles 1121 in the circumferential direction, and the rib 152 is provided with a plurality of first slots 1521, the plurality of first slots 1521 are correspondingly clamped with the plurality of first buckles 1121. As an example, there may be eleven first buckles 1121, and the baffle 112 may include two opposite long sides and two opposite short sides, one long side of the baffle 112 is provided with three first buckles 1121, another long side is provided with four first buckles 1121, and both short sides of the rim 112 are each provided with two first buckles 1121. As shown in FIGS. 3a to 3d, the first frame 151 can be provided with a locating slot, and an end of the baffle 112 away from the plate body 111 can be clamped in the locating slot.

A display device is further provided in an embodiment of the disclosure, which includes a display panel and a backlight module according to any embodiment, wherein the backlight module is disposed on a side of the display panel away from a display side.

In some exemplary embodiments, as shown in FIGS. 3a to 3d, a rubber bezel 15 of the backlight module includes a first frame 151 and a rib 152 disposed at a circumferential edge of the first frame 151. The first frame 151 may surround a circumferential side of a display panel 20 and support a portion of the display panel 20 away from a surface of the display side near a circumferential edge. The first frame 151 may be provided with a support platform 1511 that may be bonded by a double-sided adhesive foam 16. A portion of the display panel 20 away from the surface of the display side near the circumferential edge may be bonded to the support platform 1511 by a double-sided adhesive foam 16. In this way, a movement of the display panel 20 can be restricted. Furthermore, since the double-sided adhesive foam 16 has a certain elastic deformability, heights of the display panel 20 at different positions after installation can be balanced, and the flatness of the display panel 20 can be improved, which is beneficial to avoid a problem of light leakage in a dark state (L0 picture) of the display panel 20. A compression ratio of foam of the double-sided adhesive foam 16 may be greater than or equal to 60%. The rubber bezel 15 can be made of a black PC material, which can avoid a problem of bright lines or shadows around a display image of the display panel 20.

In some exemplary embodiments, as shown in FIGS. 3a to 3d, the display device may further include a front bezel 30 fixedly connected to the backlight module. The front bezel 30 may include a second frame 31 surrounded a circumferential side of the rubber bezel 15, and an annular rim 32 connected to the second frame 31 and located on a side of the first frame 151 facing away from the plate body 111, wherein the annular rim 32 can be abutted with the surface of the first frame 151 facing away from the plate body 111 and with a portion, near the circumferential edge, of the display surface of the display panel, so that the front bezel 30 can fix the display panel 20.

Figure 11:
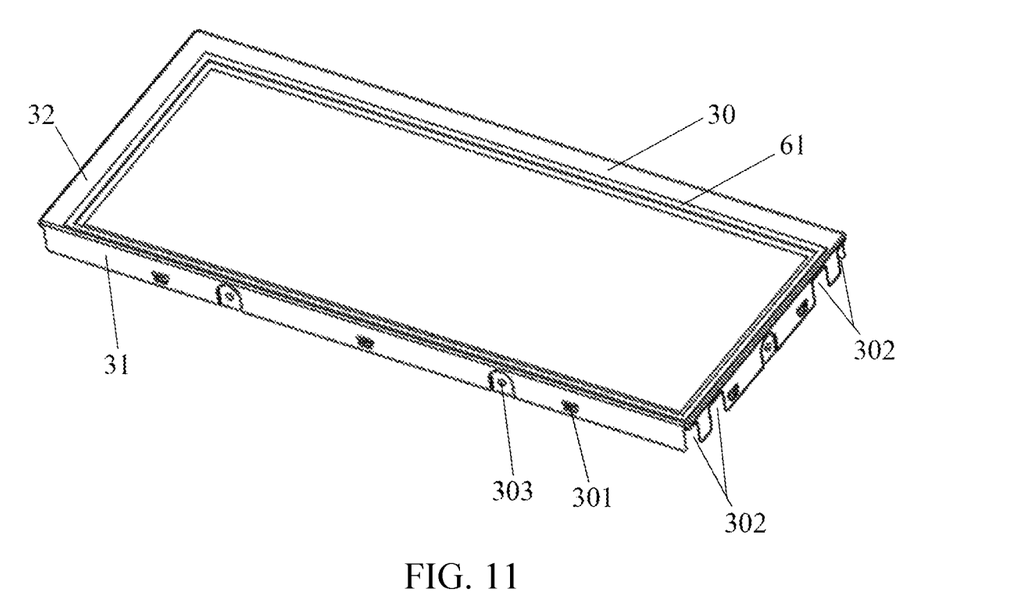
FIG. 11 is a schematic diagram of a structure of the display device in FIG. 1 according to some exemplary embodiments.
Figure 12:
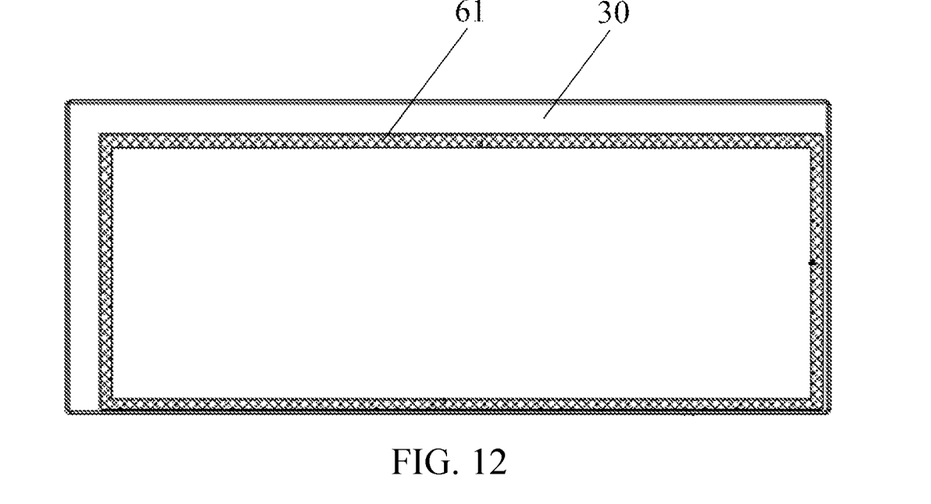
FIG. 12 is a schematic diagram of a top view of a structure of the front bezel in FIG. 11 according to some exemplary embodiments.

In an example of the present embodiment, as shown in FIGS. 3a to 3d and FIG. 11, FIG. 11 is a schematic diagram of a structure of a front bezel of a display device according to some exemplary embodiments, wherein the front bezel 30 may be connected with a backlight module by screws and may be clamped in a snap-in structure. As an example, a plurality of threaded holes 303 (shown in FIG. 11) may be disposed on the second frame 31 of the front bezel 30 in the circumferential direction, and a plurality of threaded holes may be disposed on the rib 152 of the rubber bezel 15 and on the baffle 112 of the backplate 11. The front bezel 30 is fixedly connected to the backlight module by screws provided in the threaded holes 303 on the second frame 31 and the threaded holes on the ribs 152 and the baffle 112. Specifications of the threaded hole on the baffle 112 of the backplate 11 may be M1.4*P0.3 and the length is 1.1 mm, that is, an internal thread diameter of the threaded hole is 1.4 mm, a thread pitch is 0.3 mm, and a thread length is 1.1 mm. Materials of the front bezel 30 and the backplate 11 may both be metal, for example, the material of the front bezel 30 may be stainless steel, and the material of the backplate 11 may be aluminum. As shown in FIG. 11, the second frame 31 may be in a rectangular shape, and the second frame 31 includes opposite first and second bezels and opposite third and fourth bezels, wherein the first and second bezels may be disposed along a length direction of the second frame 31, and the third and fourth bezels may be disposed along a width direction of the second frame 31. There may be four threaded holes 303, the second bezel may be provided with two threaded holes 303, and each of the third bezel and the fourth bezel may be provided with one threaded hole 303.

In an example of the present embodiment, a plurality of second slots can be disposed on the second frame along the circumferential direction, a plurality of second buckles are disposed on the baffle, and the plurality of second buckles are correspondingly clamped with the plurality of second slots through an avoidance slot disposed on the rib; or/and, the second frame can be provided with a plurality of notched grooves, and the rib is provided with a plurality of limit blocks, and the plurality of limit blocks are correspondingly clamped with the plurality of notched grooves. As an example, as shown in FIG. 11, the second frame 31 may be in a rectangular shape, and the second frame 31 includes opposite first and second bezels and opposite third and fourth bezels, wherein the first and second bezels may be disposed along a length direction of the second frame 31, and the third and fourth bezels may be disposed along a width direction of the second frame 31. A plurality of second slots 301 and a plurality of notched grooves 302 can also be disposed on the second frame 31, wherein the plurality of second slots 301 may be disposed along the circumferential direction of the second frame 31, for example, a number of the second slots 301 may be 9, the first bezel may be provided with two second slots 301, the second bezel may be provided with three second slots 301, and each of the third bezel and the fourth bezel may be provided with two second slots 301. A plurality of notched grooves 302 may be disposed on the third bezel and fourth bezel of the second frame 31, for example, the number of the notched grooves 302 may be eight, and the notched grooves 302 may be disposed at both ends of the third bezel and fourth bezel and at a middle position between the third bezel and fourth bezel. As shown in FIGS. 7 and 8, a plurality of second buckles 1122 may be disposed on the baffle 112 of the backplate 11, and the plurality of second buckles 1122 can pass through the avoidance groove 1522 disposed on the rib 152 of the rubber bezel 15 and be clamped with the plurality of second slots 301 correspondingly. As shown in FIG. 8, the two short sides of the rib 152 of the rubber bezel 15 are provided with a plurality of limit blocks 1523, which can be clamped with the plurality of notched grooves 302 correspondingly, and the shapes of the plurality of limit blocks 1523 can be the same or different. In the example in FIG. 8, the shapes of the plurality of limit blocks 1523 include triangular prism, cubic shape and L shape, and the shapes of the limit blocks 1523 are adapted to the shapes of corresponding notched grooves 302. In this example, the front bezel 30 can be more securely fixed on the backlight module by the second slot 301 clamping with the second clamping buckle 1122 and the notched groove 302 clamping with the limit block 1523.

Figure 13:
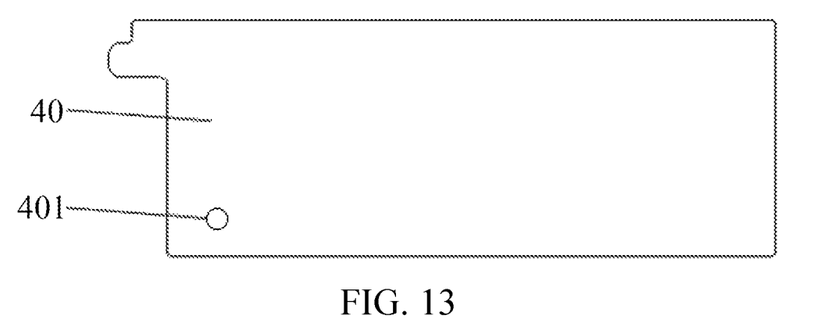
FIG. 13 is a schematic diagram of a frontal structure of a protect film of the display device in FIG. 1 according to some exemplary embodiments.
Figure 14:
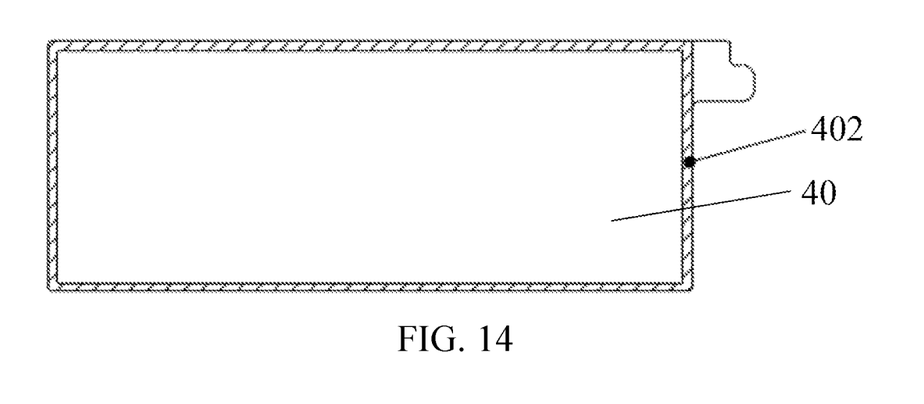
FIG. 14 is a schematic diagram of a back structure of the protect film in FIG. 13 according to some exemplary embodiments.

In some exemplary embodiments, as shown in FIGS. 3*a* to 3*d* and FIG. 12, FIG. 12 is a schematic diagram of a top view of a structure of the front bezel in FIG. 11 according to some exemplary embodiments, wherein a portion of the annular rim 32 of the front bezel 30 away from the surface of the display panel 20 near the circumferential edge of the display panel 20 and an end face of the annular rim 32 may be provided with a light-shielding layer to avoid light leakage to affect the picture quality of the display panel 20. The light-shielding layer can be a black ink layer formed by spraying. In order to improve the adhesion of the black ink layer, the black ink layer can be set as follows: ink adhesion≥3B, surface hardness>2H, 100% adhesion after 50 times of alcohol resistance test, and no background color after 240 times of friction resistance test. A portion, near the circumferential edge of the display panel 20, of the annular rim 32 of the front bezel 30 away from the surface of the display panel 20 may be provided with annular foam 61, and the annular foam 61 may be located above the light-shielding layer. The shape of the annular foam 61 may be adapted to the shape of the annular rim 32 and may be both rectangular. The annular foam 61 can be in an integral molding structure, which can prevent light leakage. The display device may further include a protect film attached to the display surface of the display device, and the protect film can protect the display panel 20 and can be torn off. As shown in FIGS. 13 and 14, FIG. 13 is a schematic diagram of a frontal structure of a protect film of a display device according to some exemplary embodiments, and FIG. 14 is a schematic diagram of a back structure of the protect film in FIG. 13 according to some exemplary embodiments, the protect film 40 may include a substrate of a transparent material, and the frontal surface of the protect film 40 may be provided with an identification area 401 that may be coated with a color (such as red). The protect film 40 may also include an annular adhesive tape 402 disposed on a back of the substrate, and the protect film 40 may be bonded to the annular foam 61 of the front bezel 30 by the annular adhesive tape 402.

In some exemplary embodiments, the display panel may include an array substrate that is provided with a binding part bound and connected with an external circuit board, wherein the binding part is disposed near a first side edge of the array substrate, a portion of the array substrate near a second side edge can be provided with a gate on array, the first side edge of the array substrate is adjacent to the second side edge, and the led-bar is disposed near the first side edge of the array substrate.

Figure 9:
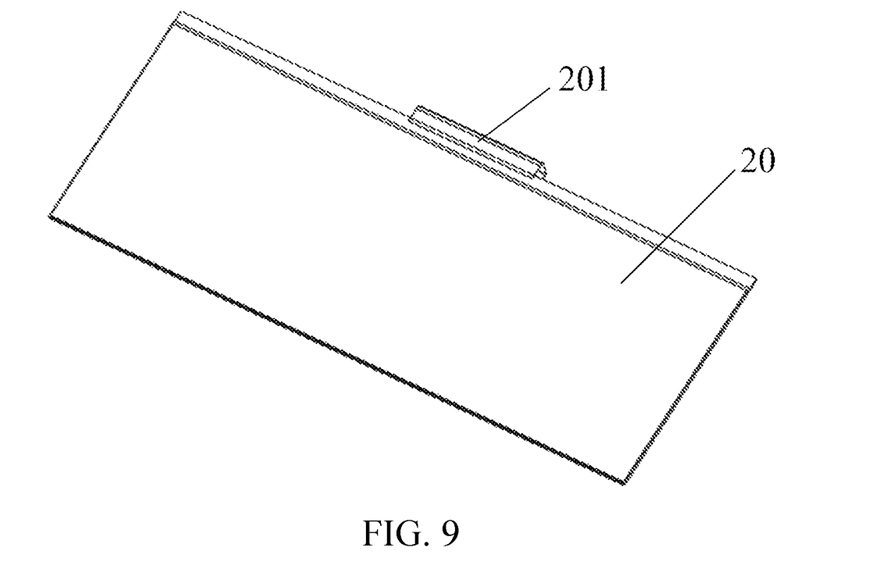
FIG. 9 is a schematic diagram of a structure of the display panel of the display device in FIG. 1 according to some exemplary embodiments.

In an example of this embodiment, as shown in FIGS. 3*c* and 9, FIG. 9 is a schematic diagram of a structure of an display panel of a display device according to some exemplary embodiments, the display panel 20 may be a liquid crystal display panel, the display panel 20 may include an array substrate 202 and a color filter substrate 203 disposed opposite to each other, a liquid crystal layer disposed between the array substrate 202 and the color filter substrate 203, and a first polarizer disposed on a side of the array substrate 202 away from the color filter substrate 203 and a second polarizer disposed on a side of the color filter substrate 203 away from the array substrate 202. The array substrate 202 may include a binding part 2021 protruding from one side of the color filter substrate 203, and the display panel 20 may further include a second circuit board 201 bound and connected with the binding part 2021, and the second circuit board 201 is configured to be connected with an external driving device to drive the display panel 20 for display. The second circuit board 201 may be a flexible circuit board and may be bent to a side of the display panel 20 away from the display side. A driver chip (driver IC) may be bound and connected to the binding unit 2021 or the second circuit board 201. The binding part 2021 is disposed near a first side edge of the array substrate 202, a portion of the array substrate 202 near a second side edge can be provided with a gate on array (GOA), the first side edge of the array substrate 202 is adjacent to the second side edge, and the led-bar 18 is disposed near the first side edge of the array substrate 202. The array substrate includes a circuit structure layer (including the GOA) disposed on the substrate, the circuit structure layer includes a plurality of gate lines and a plurality of data lines disposed intersectionally. The GOA may include a plurality of shift registers connected sequentially. Each shift register drives one gate line and provides an opening signal for the next shift register. The GOA can achieve a purpose of conducting the gate lines one by one. In the example in FIG. 9, the first side edge of the array substrate 202 is parallel to a length direction of the array substrate 202, and the second side edge of the array substrate 202 is parallel to a width direction of the array substrate 202. The lamp bar 18 is not disposed near the second side edge of the array substrate 202, thereby preventing problems such as abnormal screen display caused by peeling off of the film layer forming the gate on array on the array substrate 202 due to heat generation of the lamp bar 18. A liquid crystal material of the liquid crystal layer can be a wide temperature liquid crystal, which can improve the display quality of the liquid crystal display panel 20 in a wide temperature range.

Figure 10:
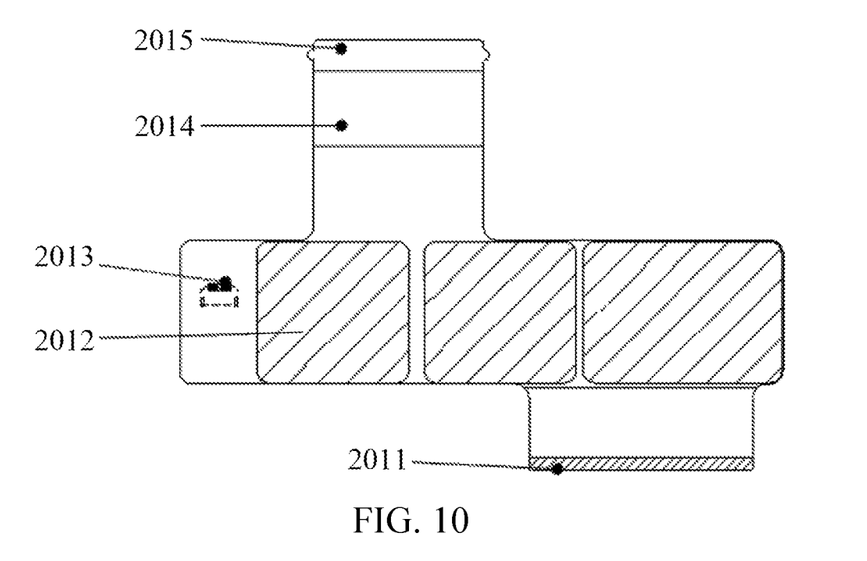
FIG. 10 is a schematic diagram of a structure of a second circuit board of the display panel in FIG. 9 according to some exemplary embodiments.

In some exemplary embodiments, as shown in FIG. 10, which is a schematic diagram of a structure of a second circuit board of the display panel in FIG. 9 according to some exemplary embodiments, the second circuit board may include a first pin area 2011, an electronic component area 2012 and a second pin area 2015, wherein the first pin area 2011 may be provided with a plurality of first pins that may be bound and connected with a binding part 2021 of the display panel 20, and the second pin region 2015 may be provided with a plurality of second pins that may be configured to be bound and connected with an external driving device to supply a power signal and a driving signal to the display panel through the second circuit board. The second circuit board can further be provided with a connector 2013 that can be configured to be electrically connected with the first circuit board of the led-bar and can provide power to the first circuit board. The second circuit board 201 may further include a reinforcing area 2014 near the second pin area 2015, and a part of the reinforcing area 2014 may be provided with glue, which is beneficial to insert a second pin of the second pin area 2015 into a connector of the external driving device and bond the connector with the second circuit board 201.

The display device according to the embodiment of the present disclosure can be used in household products such as cooking utensils, laundry equipment, dishwashers, refrigerators, freezers, microwave ovens, coffee machines or ovens. Or, the display device according to the embodiments of the present disclosure may be any product or component with a display function, such as a mobile phone, a tablet, a television, a display, a laptop computer, a digital photo frame, or a navigator.

In the accompanying drawings, the size of a constituent element, and the thickness of a layer or an area are sometimes exaggerated for clarity. Therefore, one implementation of the present disclosure is not necessarily limited to the size, and the shape and size of each component in the drawings do not reflect the actual scale. In addition, the drawings schematically illustrate some examples, and one implementation of the present disclosure is not limited to the shapes or numerical values shown in the drawings.

In the description herein, "parallel" refers to a state in which an angle formed by two straight lines is above −10° and below 10°, and thus also includes a state in which the angle is above −5° and below 5°. In addition, "vertical" refers to a state in which an angle formed by two straight lines is above 80° and below 100°, and thus also includes a state in which the angle is above 85° and below 95°.

In the description herein, orientation or position relationships indicated by the terms such as "upper", "lower", "left", "right", "top", "inside", "outside", "axial", "tetragonal" and the like are orientation or position relationships shown in the drawings, and are intended to facilitate description of the embodiments of the present disclosure and simplification of the description, but not to indicate or imply that the mentioned structure has a specific orientation or be constructed and operated in a specific orientation, therefore, they should not be understood as limitations on the present disclosure.

In the description herein, unless otherwise specified and defined explicitly, the terms "connection", "fixed connection", "installation" and "assembly" should be understood in a broad sense, and, for example, may be a fixed connection, a detachable connection or an integrated connection; the terms "installation", "connection" and "fixed connection" may be a direct connection, an indirect connection through intermediate components, or communication inside two components. For those ordinarily skilled in the art, meanings of the above terms in the embodiments of the present disclosure can be understood according to situations.

The invention claimed is:

1. A backlight module comprising a backplate, a led-bar, a light guide plate and an optical sheet group; wherein
the backplate comprises a plate body and a baffle disposed at a circumferential edge of the plate body, the light guide plate is disposed at one side of the plate body, and the light guide plate has a light exit surface away from the plate body and a light entrance surface adjacent to the light exit surface, and the led-bar is disposed at the baffle and comprises a plurality of light sources disposed towards the light entrance surface of the light guide plate;
a portion of the light exit surface of the light guide plate near the light entrance surface is provided with a step structure in which heights of steps gradually decrease in a first direction;
the optical sheet group comprises a plurality of optical sheets stacked on the side where the light exit surface of the light guide plate is located, and each of the optical sheets is fixed to a corresponding step in the step structure; and
the plurality of optical sheets comprise a first prism sheet, a plurality of first prisms disposed side by side are disposed on a surface of the first prism sheet facing away from the light guide plate, the first prisms extend in a direction perpendicular to the first direction, an edge of the first prism sheet is provided with a notched groove that avoids the step structure, and a gap is provided between a groove wall, which is parallel to the first direction, of the notched groove of the first prism sheet and the step structure, wherein the gap ranges from 0.5 mm to 0.8 mm.

2. The backlight module of claim 1, wherein a surface of the step structure facing away from the plate body is bonded to a plurality of the optical sheets by a light-shielding tape, the edges of the plurality of the optical sheets are provided with notched grooves to avoid the step structure.

3. The backlight module of claim 1, wherein the optical sheet group comprises a first diffuser sheet, the first prism sheet, a second prism sheet, and a second diffuser sheet that are sequentially stacked on the light exit surface of the light guide plate, wherein a surface of the second prism sheet facing away from the light guide plate is provided with a plurality of second prisms disposed side by side, and the second prisms extend in a direction parallel to the first direction.

4. The backlight module of claim 1, wherein the baffle is disposed around circumferential sides of the light guide plate and the plurality of optical sheets, and each of the circumferential edges of the light guide plate and the plurality of optical sheets have a gap with the baffle.

5. The backlight module of claim 1, further comprising a rubber bezel that comprises a first frame and a rib disposed at a circumferential edge of the first frame, wherein the first frame is disposed at a side of the optical sheet group facing away from the light guide plate, and the rib surrounds a circumferential side of the baffle.

6. The backlight module of claim 5, wherein the baffle is provided with a plurality of first buckles in the circumferential direction, the rib is provided with a plurality of first slots, and the plurality of first slots are correspondingly clamped with the plurality of first buckles.

7. The backlight module of claim 1, further comprising a reflector sheet disposed on a side of the light guide plate facing away from the light exit surface, and a circumferential edge of the reflector sheet is provided with a flange that is attached on the circumferential side of the light guide plate and avoids the light entrance surface.

8. A display device comprising a display panel and a backlight module of claim 1, wherein the backlight module is disposed on a side of the display panel facing away from the display side.

9. The display device of claim 8, wherein the display panel comprises an array substrate that is provided with a binding part bound and connected with an external circuit board, wherein
the binding part is disposed near a first side edge of the array substrate, a portion of the array substrate near a second side edge is provided with a gate on array,
the first side edge of the array substrate is adjacent to the second side edge, and
the led-bar is disposed near the first side edge of the array substrate.

10. The display device of claim 8, wherein the backlight module further comprises a rubber bezel that comprises a first frame and a rib disposed at a circumferential edge of the first frame, wherein the first frame is disposed at a side of the optical sheet group facing away from the light guide plate, and the rib surrounds a circumferential side of the baffle; and
the first frame further surrounds a circumferential side of the display panel, and the first frame is provided with a support platform, and a portion of the display panel facing away from the surface of the display side near the circumferential edge is bonded to the support platform by a double-sided adhesive foam.

11. The display device of claim 10, further comprising a front bezel fixedly connected to the backlight module, wherein the front bezel comprises a second frame surrounded a circumferential side of the rubber bezel, and an annular rim connected to the second frame and located on a side of the first frame facing away from the plate, and the annular rim is abutted with the surface of the first frame facing away from the plate body and with a portion, near the circumferential edge, of the display surface of the display panel.

12. The display device of claim 11, wherein a plurality of second slots are disposed on the second frame along the circumferential direction, a plurality of second buckles are disposed on the baffle, and the plurality of second buckles are correspondingly clamped with the plurality of second slots through an avoidance slot disposed on the rib.

13. The display device of claim 11, wherein a plurality of notched grooves are disposed on the second frame, a plurality of limit blocks are disposed on the rib, and the plurality of limit blocks are correspondingly clamped with the plurality of notched grooves.

* * * * *